United States Patent
Momose et al.

(10) Patent No.: US 7,189,438 B2
(45) Date of Patent: Mar. 13, 2007

(54) MAGNETIC RECORDING MEDIUM, METHOD OF PRODUCING MAGNETIC RECORDING MEDIUM AND MAGNETIC STORAGE APPARATUS

(75) Inventors: Satoru Momose, Kawasaki (JP); Hiroyoshi Kodama, Kawasaki (JP); Nobutaka Ihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 240 days.

(21) Appl. No.: 10/845,868

(22) Filed: May 14, 2004

(65) Prior Publication Data

US 2004/0229006 A1 Nov. 18, 2004

(30) Foreign Application Priority Data

May 14, 2003 (JP) .............................. 2003-136242
Apr. 16, 2004 (JP) .............................. 2004-121808

(51) Int. Cl.
*B29X 35/08* (2006.01)

(52) U.S. Cl. ...................... 427/598; 427/599; 427/128; 427/129; 427/132

(58) Field of Classification Search ................ 427/548, 427/128, 129, 130, 132, 598, 599
See application file for complete search history.

(56) References Cited

U.S. PATENT DOCUMENTS

| | | | |
|---|---|---|---|
| 3,243,281 A | * | 3/1966 | Schmidt ...................... 75/388 |
| 3,888,759 A | * | 6/1975 | Elson et al. ................. 204/620 |
| 6,712,997 B2 | * | 3/2004 | Won et al. ................... 252/503 |
| 6,783,569 B2 | * | 8/2004 | Cheon et al. ................. 75/348 |
| 2003/0113582 A1 | * | 6/2003 | Litvinov et al. ......... 428/694 T |

FOREIGN PATENT DOCUMENTS

| | | |
|---|---|---|
| JP | 2000-048340 | 2/2000 |
| JP | 2000-054012 | 2/2000 |
| JP | 2003-073705 | 3/2003 |
| JP | 2003-132519 | 5/2003 |
| JP | 2003-248916 | 9/2003 |

OTHER PUBLICATIONS

Sun et al., *Monodisperse FePt Nanoparticles and Ferromagnetic FePt Nanocrystal Superlattices*, Science, vol. 287, Mar. 17, 2000, pp. 1989-1992.

* cited by examiner

Primary Examiner—Alain L. Bashore
(74) Attorney, Agent, or Firm—Greer, Burns & Crain, Ltd.

(57) ABSTRACT

A magnetic recording medium has a recording layer, disposed above a surface of a substrate and made of hard magnetic nano-particles. The hard magnetic nano-particles are made of an alloy having as a main component an element selected from a group consisting of FePt, FePd and CoPt, and the hard magnetic nano-particles have axes of easy magnetization oriented in a direction approximately perpendicular to the surface of the substrate.

18 Claims, 7 Drawing Sheets

MAGNETIC RECORDING MEDIUM, METHOD OF PRODUCING MAGNETIC RECORDING MEDIUM AND MAGNETIC STORAGE APPARATUS

BACKGROUND OF THE INVENTION

This application claims the benefit of a Japanese Patent Applications No.2003-136242 filed May 14, 2003 and No.2004-121808 filed Apr. 16, 2004, in the Japanese Patent Office, the disclosure of which is hereby incorporated by reference.

1. Field of the Invention

The present invention generally relates to magnetic recording media, methods of producing magnetic recording media and magnetic storage apparatuses, and more particularly to a magnetic recording medium which uses magnetic nano-particles, a method of producing such a magnetic recording medium, and a magnetic storage apparatus which uses such a magnetic recording medium.

2. Description of the Related Art

Due to the rapid increase in the amount of information to be stored, there are increased demands to further reduce the cost and to further increase the storage capacity and the operation speed of the magnetic recording media which are used as external storage units of computers and as household video storage apparatuses. In order to satisfy such demands, it is important to increase the recording density of the magnetic recording media. Recently, the recording density of the magnetic recording media in magnetic disk drives have increased at a rate of approximately 100% each year.

The recording unit of a recording layer of the magnetic recording medium may be made smaller in order to improve the recording density, and for this purpose, a magnetic cluster which forms one recording unit may be made smaller. The smallest size of the magnetic cluster becomes approximately the same as the physical size of the crystals forming the magnetic cluster, that is, approximately the same as the crystal grain diameter. Accordingly, various techniques have been proposed to reduce the crystal grain diameter.

However, the thermal stability of the magnetic recording medium deteriorates if the crystal grain diameter is simply reduced, and the magnetically recorded information is erased when the thermal stability deteriorates. In order to secure a sufficient thermal stability, it is necessary to increase an anisotropic energy to compensate for the reduced amount of volume of the crystal grain caused by the reduction of the crystal grain diameter.

On the other hand, in the longitudinal recording system using a continuous magnetic layer, the signal-to-noise ratio (SNR) decreases (or deteriorates) due to the transition noise which increases as the recording density increases. The transition noise occurs due to exchange-coupling and static magnetic coupling among the crystal grains. The exchange-coupling and the static magnetic coupling of the crystal grains are dependent on the distances among the crystal grains and on the inconsistencies in the distances among the crystal grains.

In order to solve the problems described above, FePt nano-particles displaying hard magnetic characteristics, which are formed by chemical techniques and self-align, have been proposed in Japanese Laid-Open Patent Applications No.2000-48340 and No.2000-54012 and in Sun et al., Science vol. 287 (2000), pp.1989–1992. The FePt nano-particles have an anisotropic energy higher than the conventional CoCrPt alloy. For this reason, the FePt nano-particles can maintain the thermal stability even though the grain diameter is small. The average grain diameter of the FePt nano-particles is 4 nm, and the grain diameter distribution is slightly smaller than that of the conventional continuous magnetic metal layer. In addition, the FePt nano-particles are uniformly arranged in self-alignment. For these reasons, it is expected that the FePt nano-particles can also reduce the transition noise.

In order to induce a sufficiently large reproduced output of a magnetic head, the axes of easy magnetization (or magnetic easy axes) of the FePt nano-particles must be oriented in-plane for the longitudinal (in-plane) recording system and oriented perpendicularly for the perpendicular recording system.

But in a state where the FePt nano-particles are chemically formed, the FePt crystals are formed by a disordered layer of fcc and have an extremely small magnetic anisotropy, thereby making it impossible to hold recorded information in this state. In order to increase the magnetic anisotropy of the FePt crystals and to generate the axis of easy magnetization, it is necessary to order the crystals, which requires a thermal process in a vacuum atmosphere (or environment) at a high temperature of 500° C. or higher.

When the thermal process is carried out at the high temperature after forming the FePt nano-particles, however, problems are encountered. For example, in the case of a perpendicular magnetic recording medium having a soft magnetic back layers the soft magnetic back layer consisting of amorphous or microcrystalline changes to a crystalline layer. In this case, particularly the high-frequency permeability decreases and the write characteristic at a high transfer rate at the time of the recording deteriorates. In addition, a glass substrate which is used as a base for the magnetic recording medium such as a magnetic disk, and a polyimide film which is used as a base for the magnetic recording medium such as a magnetic tape, undergo thermal deformation at the high temperature. When the base of the magnetic recording medium undergoes such thermal deformation, the reliability of an interface between the magnetic head and the magnetic recording medium greatly deteriorates.

In order to reduce the temperature of the thermal process, it is conceivable to carry out the thermal process in a nitrogen or Ar gas atmosphere. However, when the thermal process is carried out in the nitrogen or Ar gas atmosphere, the FePt nano-particles may fuse together. The transition noise will greatly increase if the grain diameter increases or the grain diameter distribution increases due to the fusing of the FePt nano-particles.

SUMMARY OF THE INVENTION

Accordingly, it is a general object of the present invention to provide a novel and useful magnetic recording medium, method of producing magnetic recording medium and magnetic storage apparatus, in which the problems described above are suppressed.

Another and more specific object of the present invention is to provide a magnetic recording medium which has hard magnetic nano-particles with an improved orientation in a direction perpendicular to a substrate surface to enable high-density recording, and to a method of producing such a magnetic recording medium and to a magnetic storage apparatus which uses such a magnetic recording medium.

Another specific object of the present invention is to provide a method of producing a magnetic recording medium which does not require a thermal process at a relatively high temperature after forming a recording layer above a substrate, and to a magnetic recording medium which is produced by such a method and to a magnetic storage apparatus which uses a magnetic recording medium which is produced by such a method.

Still another object of the present invention is to provide a magnetic recording medium comprising a substrate having a surface; and a recording layer, disposed above the surface of the substrate, and made of hard magnetic nano-particles; the hard magnetic nano-particles being made of an alloy having, as a main component, an element selected from a group consisting of FePt, FePd and CoPt, the hard magnetic nano-particles having axes of easy magnetization oriented in a direction approximately perpendicular to the surface of the substrate. According to the magnetic recording medium of the present invention, the hard magnetic nano-particles have an improved orientation in the direction perpendicular to the surface to enable high-density recording.

A further object of the present invention is to provide a magnetic storage apparatus comprising at least one magnetic recording medium; and a head configured to record information on and/or reproduce information from the magnetic recording medium, the magnetic recording medium comprising a substrate having a surface; and a recording layer, disposed above the surface of the substrate, and made of hard magnetic nano-particles, the hard magnetic nano-particles being made of an alloy having, as a main component, an element selected from a group consisting of FePt, FePd and CoPt, the hard magnetic nano-particles having axes of easy magnetization oriented in a direction approximately perpendicular to the surface of the substrate. According to the magnetic storage apparatus of the present invention, it is possible to carry out a high-density recording on the magnetic recording medium.

Another object of the present invention is to provide a method of producing a magnetic recording medium having a recording layer made of hard magnetic nano-particles, comprising the steps of (a) forming nano-particles; (b) heating the nano-particles and ordering crystals to transform the nano-particles into hard magnetic nano-particles; (c) forming the recording layer by coating the hard magnetic nano-particles on a surface and applying a magnetic field in a direction approximately perpendicular to the surface to orient the hard magnetic nano-particles. According to the method of the present invention, it is possible to obtain the hard magnetic nano-particles with an improved orientation in the direction perpendicular to the surface to enable high-density recording. Further, it is unnecessary to carry out a thermal process at a relatively high temperature after forming the recording layer.

Other objects and further features of the present invention will be apparent from the following detailed description when read in conjunction with the accompanying drawings.

DESCRIPTION OF THE PREFERRED EMBODIMENTS

Figure 1:
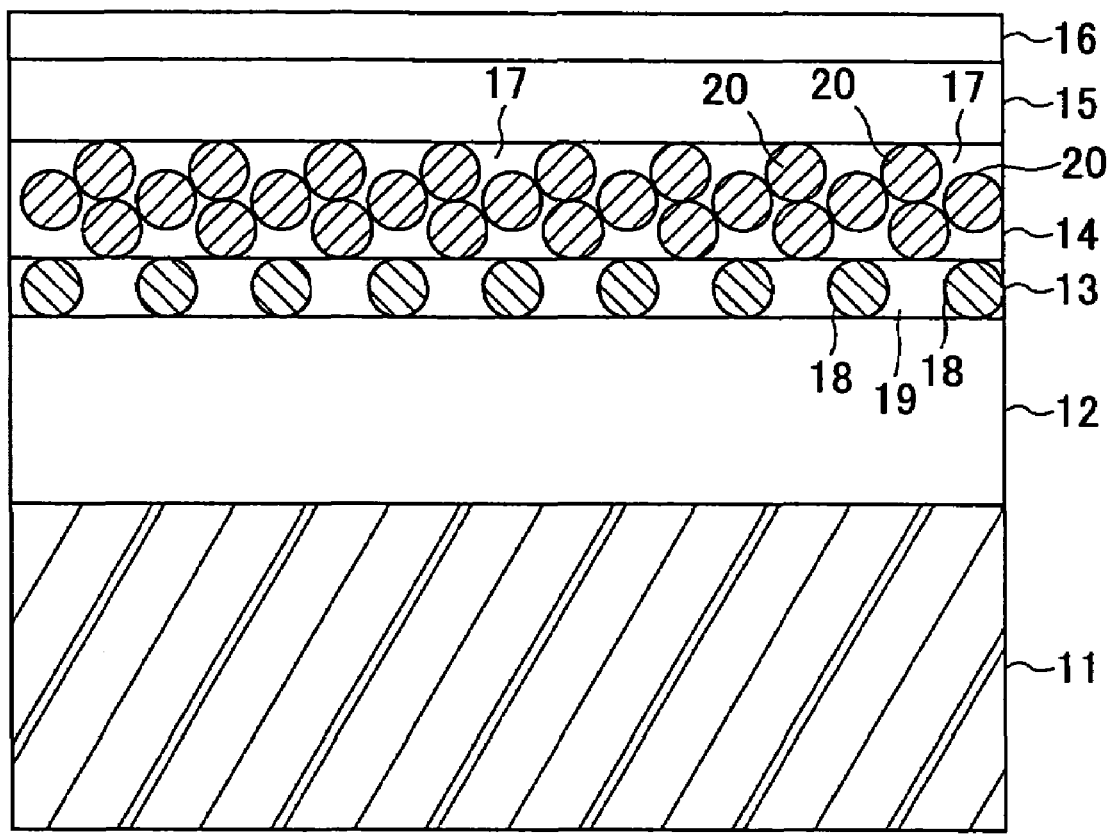
FIG. 1 is a cross sectional view generally showing a first embodiment of a magnetic recording medium according to the present invention.

FIG. 1 is a cross sectional view generally showing a first embodiment of a magnetic recording medium according to the present invention. A perpendicular magnetic recording medium 10 shown in FIG. 1 includes a substrate 11, a soft magnetic back layer 12, an intermediate layer 13, a recording layer 14 made of hard magnetic nano-particles 20, a protection layer 15 and a lubricant layer 16 which are successively stacked in this order.

For example, in the substrate 11, there are a crystalline glass substrate, a reinforced glass substrate, a silicon (Si) substrate, a heat-resistant film such as a polyamide film or the like.

For example, the soft magnetic back layer 12 has a thickness of 50 nm to 2 μm, and is made of an amorphous or microcrystalline alloy including at least one element selected from a group consisting of Fe, Co, Ni, Al, Si, Ta, Ti, Zr, Hf, V, Nb, C and B. The soft magnetic back layer 12 may be made of a stacked structure having a plurality of layers made of such an alloy and stacked. In other words, the soft magnetic back layer 12 is made of a soft magnetic material having a high saturation magnetic flux density Bs. For example, materials such as FeSi, FeAlSi, FeTaC, NiFeNb and CoCrNb may be used for the soft magnetic back layer 12. The soft magnetic back layer 12 may be formed by plating, sputtering, vapor deposition, Chemical Vapor Deposition (CVD) or the like. It is particularly preferable to employ the sputtering to form the soft magnetic back layer 12. The soft magnetic back layer 12 is provided to absorb all magnetic flux from a single-pole magnetic recording head when recording information by the single-pole magnetic recording head. In order to perform saturation recording, it is preferable that a product of the saturation magnetic flux density Bs and the thickness of the soft magnetic back layer 12 has a large value. In addition, it is preferable that the soft magnetic back layer 12 has a high-frequency permeability that is high, so that the write performances at the high transfer rate are improved. When recording the information by a ring type magnetic recording head (or ring head), it is possible to omit the soft magnetic back layer 12.

In the intermediate layer 13, self-organizing soft magnetic nano-particles 18 are arranged in a state isolated by carbon phase 19. For example, the soft magnetic nano-particles 18 are made of a soft magnetic material such as $Fe_2O_3$ and NiFe (permalloy), and gaps between the soft magnetic nano-particles 18 are filled by amorphous carbon or the like. As will be described later, the soft magnetic nano-particles 18 are obtained by a chemical method. The soft magnetic nano-particles 18 have a grain diameter of 1 nm to 20 nm. Preferably, the grain diameter of the magnetic nano-particles 18 is approximately the same as the grain diameter of hard magnetic nano-particles 20 forming the recording layer 14 which is formed on the intermediate layer 13, so that the interface between the intermediate layer 13 and the recording layer 14 becomes uniform and the surface of the recording layer 14 can be planarized.

Preferably, a ratio σ/D of a standard deviation σ with respect to an average grain diameter D of the soft magnetic nano-particles 18 is set to 10% or less. In addition, the size of the gaps between the soft magnetic nano-particles 18 is preferably set to 1 nm to 5 nm, and this gap size is preferably approximately the same as the size of the gaps between the hard magnetic nano-particles 20 of the recording layer 14.

The soft magnetic nano-particles 18 are formed in one to five layers which are stacked. The magnetic flux associated with the recording magnetic field which is applied on the perpendicular magnetic recording medium 10 at the time of recording information flows perpendicularly through the recording layer 14, and passes the soft magnetic nano-particles which are isolated and arranged within the carbon phase 19 before reaching the soft magnetic back layer 12. Thus, the magnetic flux is constricted, thereby making it possible to concentrate the magnetic flux associated with the recording magnetic field by preventing the magnetic flux from spreading in the in-plane direction in a vicinity of the interface between the recording layer 14 and the intermediate layer 13. As a result, the write performances, such as the overwrite performance, is improved. Particularly from the point of view of the effects of constricting the magnetic flux, the intermediate layer 13 is preferably formed by a single layer of the soft magnetic nano-particles 18.

Instead of using the soft magnetic nano-particles 18, the intermediate layer 13 may be formed by a nonmagnetic material such as Ti, C, Pt, TiCr, CoCr, $SiO_2$, MgO and $Al_2O_3$ having a thickness of 1 nm to 50 nm. The intermediate layer 13 may also be formed by a stacked structure having a plurality of layers made of such a nonmagnetic material and stacked, so as to block the electromagnetic interaction between the soft magnetic back layer 12 and the recording layer 14. In this case, the intermediate layer 13 may be formed by sputtering, vapor deposition, CVD or the like.

In the recording layer 14, the hard magnetic nano-particles 20 are arranged in a fixed state where gaps between the hard-magnetic nano-particles 20 are filled by carbon phase 17, for example. The recording layer 14 has a thickness of 3 nm to 50 nm, for example. In addition, the hard magnetic nano-particles 20 of the recording layer 14 may be formed in a single layer or, in a plurality of layers which are stacked in a direction taken along the thickness of the recording layer 14.

For example, the hard magnetic nano-particles 20 are made of an alloy having FePt, FePd, CoPt, CoPd or the like as a main component, and is formed by a method which will be described later. The alloy used for the hard magnetic nano-particles 20 has a high magnetic anisotropy energy which enables a high perpendicular coercivity to be obtained. For example, the alloy used for the hard magnetic nano-particles 20 may be $Fe_{100-x}Pt_x$, $Fe_{100-x}Pd_x$, $Co_{100-x}Pt_x$ or $Co_{100-x}Pd_x$, where X is preferably 20 at. % to 60 at. %, and more preferably 35 at. % to 55 at. %. In such composition ranges, the magnetic anisotropy energy is high, and it is possible to obtain a high perpendicular coercivity. On the other hand, the hard magnetic nano-particles 20 may be formed by $Fe_3Pt$, $FePt_3$, $Fe_3Pd$, $FePd_3$, $Cd_3Pt$, $CoPt_3$ or the like.

It is possible to add a third element, such as Ag, Au, Cu, Sb and Ni, to the above-described 2-element alloy forming the hard magnetic nano-particles 20. In a case where the magnetic anisotropy energy obtained by use of the 2-element alloy is too high, it is possible to reduce and adjust the magnetic anisotropy energy depending on the magnitude of the recording magnetic field of the magnetic recording head by adding the third element, so as to improve the write performances.

The average grain diameter of the hard magnetic nano-particles 20 is set in a range of 2 nm to 10 nm. If the average grain diameter of the hard magnetic nano-particles 20 exceeds 10 nm, the volume of the nonmagnetic gap portion between the hard magnetic nano-particles 20 becomes large to increase the medium noise. On the other hand, if the average grain diameter of the hard magnetic nano-particles 20 becomes less than 2 nm, the hard magnetic nano-particles 20 easily becomes super-paramagnetic at room temperature, thereby making it difficult to maintain the hard magnetic nano-particles 20 ferromagnetic.

A standard deviation of the grain diameter of the hard magnetic nano-particles 20 is set to a range which is less than or equal to 10% of the average grain diameter. If the standard deviation of the grain diameter of the hard magnetic nano-particles 20 exceeds 10% of the average grain diameter, the static magnetic interaction distribution of the hard magnetic nano-particles 20 increases, to thereby increase the medium noise.

The axes of easy magnetization of the hard magnetic nano-particles 20 are oriented approximately in a perpendicular direction which is perpendicular to the surface of the substrate 11. In other words, the axes of easy magnetization of the individual hard magnetic nano-particles 20 have an angular distribution about the perpendicular direction. This angular distribution is described by a ratio Hc2/Hc1 of a perpendicular coercivity Hc1 and an in-plane coercivity Hc2 of the recording layer 14. The ratio Hc2/Hc1 is 40% or less, preferably 30% or less, and more preferably 10% or less. In such ranges of the ratio Hc2/Hc1, a width of a magnetization transition region in a remanent magnetization state after the recording becomes narrow, so that the perpendicular magnetic recording medium 10 becomes suited for high-density recording.

In a method of producing this embodiment of the magnetic recording medium, which will be described later, the axes of easy magnetization of the hard magnetic nano-particles 20 are oriented under room temperature by applying a magnetic field, when coating hexane including the hard magnetic nano-particles 20 above the substrate 11.

The protection layer 15 may be made of carbon, carbon hydride, carbon nitride and the like. The protection layer 15 has a thickness in a range of 0.5 nm to 15 nm.

The lubricant layer 16 may be made of a lubricant having perfluoropolyether as a main chain, for example. ZDol manufactured by Monte Fluos (terminal functional group: —OH), AM3001 manufactured by Ausimonoto (terminal functional group: benzene ring), Z25 manufactured by Monte Fluos, and the like, with a thickness in a range of 0.5 nm to 5 nm, may be used for the lubricant layer 16.

Figure 2:
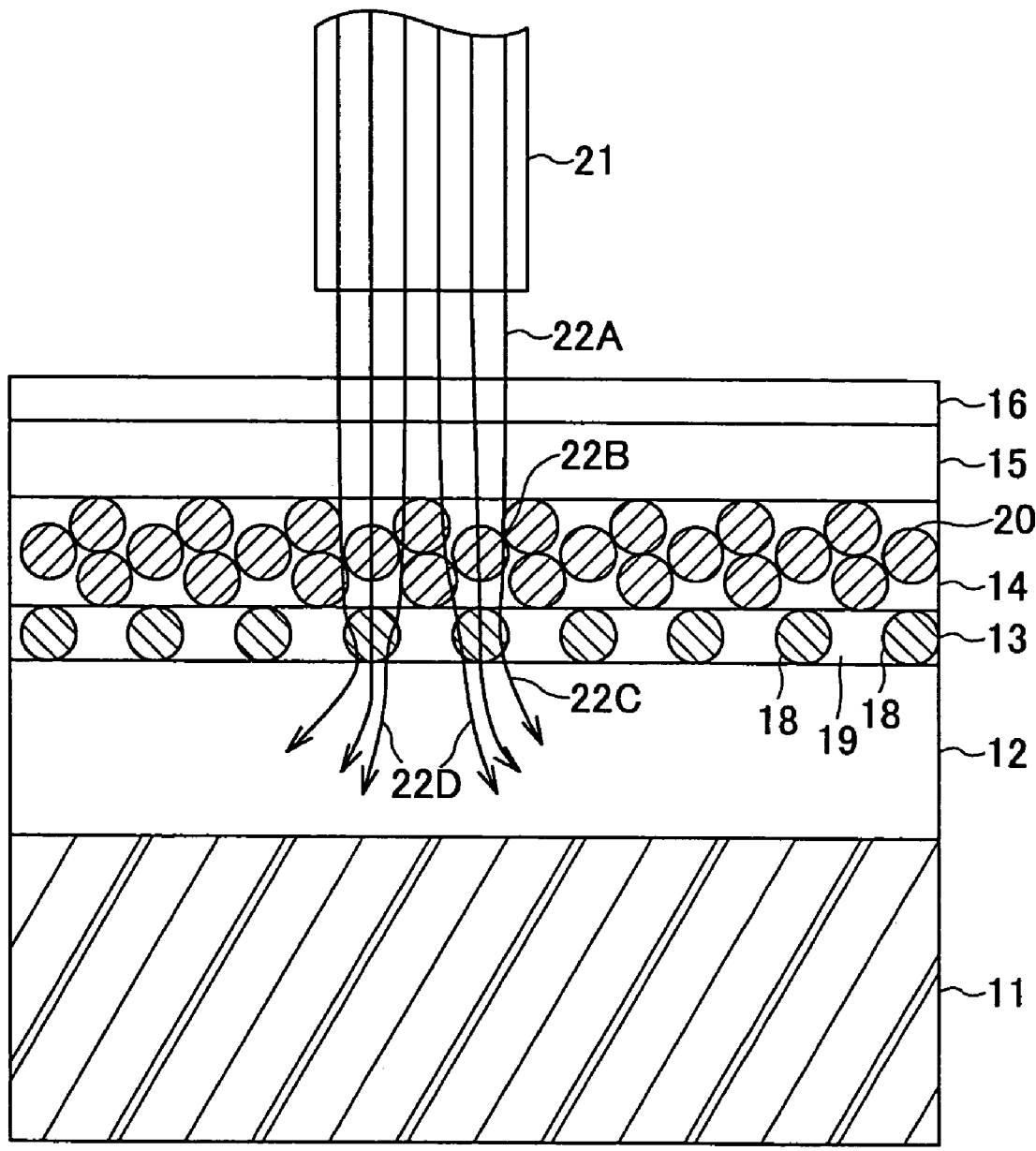
FIG. 2 is a cross sectional view schematically showing a flow of magnetic flux applied by a magnetic recording head when writing information on the magnetic recording medium shown in FIG. 1.

FIG. 2 is a cross sectional view schematically showing a flow of the magnetic flux applied by the magnetic recording head when writing information on the perpendicular magnetic recording medium 10 shown in FIG. 1. It is assumed that a single-pole head 21 is used as the magnetic recording head for the perpendicular magnetic recording. A magnetic flux 22A from the single-pole head 21 passes through the recording layer 14 as a magnetic flux 22B, reaches the soft magnetic back layer 12 via the intermediate layer 13 as a magnetic flux 22C, and spreads as a magnetic flux 22D after reaching the soft magnetic back layer 12.

In this embodiment of the perpendicular magnetic recording medium 10, the intermediate layer 13 is formed by the soft magnetic nano-particles 18 which are arranged at predetermined intervals and isolated, and the amorphous carbon phase 19 which fill the gaps between the soft magnetic nano-particles 18. For this reason, the magnetic flux 22B passing through the recording layer 14 only flows through the soft magnetic nano-particles 18 as the magnetic flux 22C. Hence, the magnetic flux 22B passing through the recording layer 14 is once constricted by the soft magnetic nano-particles 18 of the intermediate layer 13, as the magnetic flux 22C, and the magnetic flux density increases, before reaching the soft magnetic back layer 12. In other words, the effect of increasing the magnetic flux density due to the constriction of the magnetic flux by the soft magnetic nano-particles 18 is added to the mirror image effect of the soft magnetic back layer 12, to thereby considerably improve the write performances of the perpendicular magnetic recording medium 10. Consequently, write performances such as the overwrite performance and the Non-Linear-Transition-Shift (NLTS) performance are considerably improved, thereby making it possible to carry out the high-density recording at an even higher recording density.

In this embodiment of the perpendicular magnetic recording medium 10, the recording layer 14 has a good perpendicular orientation and is formed by the hard magnetic nano-particles 20 which are arranged by the self-alignment. Therefore, it is possible to realize a high output and low noise, and a good high-density recording can be carried out. Moreover, since the hard magnetic nano-particles 20 are formed by an Fe or Co alloy having the fct structure and has a high magnetic anisotropy energy, it is possible to maintain thermal stability.

Next, a description will be given of a first embodiment of a method of producing a magnetic recording medium according to the present invention. It is assumed for the sake of convenience that the perpendicular magnetic recording medium 10 is produced by this first embodiment of the method.

(Formation of Hard Magnetic Nano-Particles)

First, a description will be given of a method of forming the hard magnetic nano-particles 20 which form the recording layer 14 of the perpendicular magnetic recording medium 10.

Forming Nano-Particles:

First, nano-particles, which are precursors of the hard magnetic nano-particles 20, are formed using a chemosynthesis method. For example, a Pt complex, a reductant and a solvent are added into a flask under an Ar atmosphere. For example, 197 mg (0.5 mmol) of platinum acetylacetonate ($Pt(C_5H_7O_2)_2$) is used as the Pt complex, 390 mg (1.5 mmol) of 1,2-hexadecanediol is used as the reductant, and 20 ml of dioctylether is used as the solvent.

Next, organic stabilizers and an Fe complex are added into the flask. For example, 0.32 ml (1.0 mmol) of oleic acid and 0.34 ml (1.0 mmol) of oleyl amine are used as the stabilizers. In addition, 0.13 ml (1.0 mmol) of iron pentacarbonyl ($Fe(CO)_5$) is used as the Fe complex. For example, the solution within the flask is agitated for approximately 30 minutes at a temperature of approximately 230° C. to cause a reaction. The solution within the flask may be agitated for 10 minutes to 30 minutes at a temperature of 100° C. to 300° C. to cause the reaction. As a result, FePt nano-particles are generated within the flask. In this state, the FePt nano-particles are in a disordered phase and do not display ferromagnetic characteristics. The composition of the FePt nano-particles which are generated may be controlled based on a ratio of the amounts of the Pt complex and the Fe complex used.

Thereafter, the solution within the flask is cooled to room temperature. In addition, 40 ml of ethanol is added into the flask, and a precipitation of the FePt nano-particles and the organic stabilizers is obtained by use of a centrifuge.

Next, hexane is added to the precipitation of the FePt nano-particles and the organic lubricants in the flask. As a result, it is possible to obtain FePt nano-particles which are dispersed within the hexane. Under the above described conditions, the FePt nano-particles obtained have an average grain diameter of 4.3 nm, a Fe:Pt composition ratio of 50 (at. %):50 (at. %).

Instead of using $Fe(CO)_5$, it is possible to use $Fe_2(CO)_9$ or $Fe_3(CO)_{12}$ as the Fe complex. In addition, instead of using acetylacetonate salt such as $Pt(C_5H_7O_2)_2$ or, $Fe(CO)_5$, it is possible to use metal compounds such as organic acid salt which is selected from a group consisting of carboxylic acid salt, prussiate, sulfonic acid salt and phosphonate. For example, a metal element included in such metal compounds includes Fe, Co, Ni, Pt, Cu and Ag. For example, it is possible to include two or more kinds of metal compounds to form the FePt nano-particles.

In addition, the composition ratio of the FePt nano-particles may be controlled by a ratio of the amounts of $Pt(C_5H_7O_2)_2$ and $Fe(CO)_5$ used. In addition, it is possible to similarly control the compositions of the FePd, CoPt, FePtAg, FePtCu and the like by a ratio of the amounts of the metal compounds used.

Figure 3:
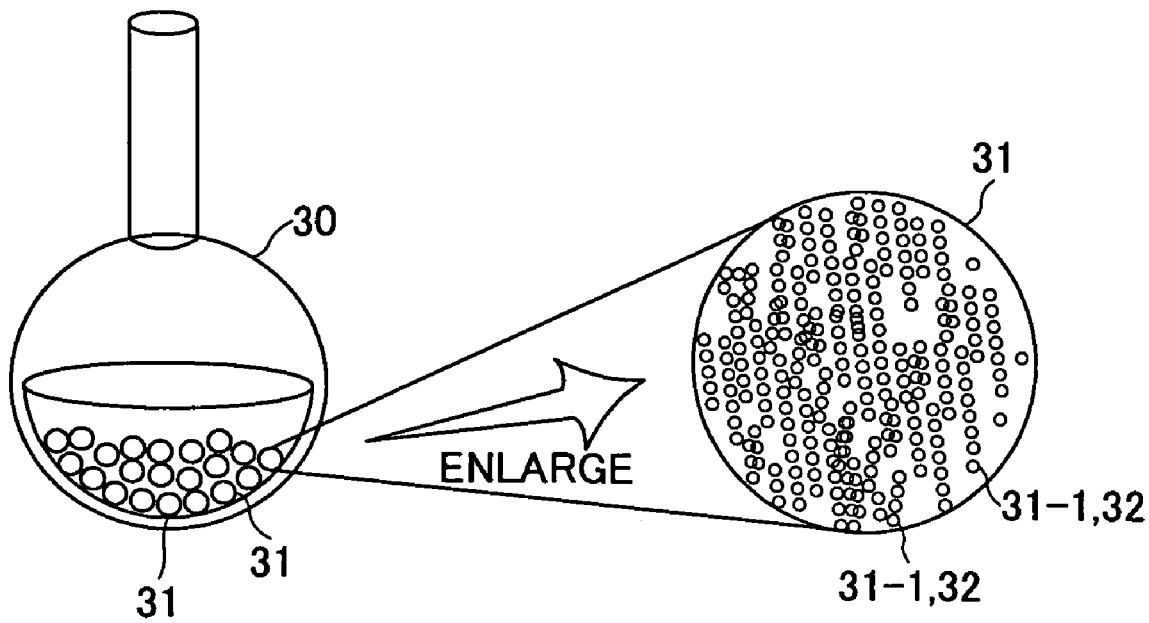
FIG. 3 is a diagram showing an apparatus for embedding nano-particles in a silica gel in a first embodiment of a method of producing a magnetic recording medium according to the present invention, together with the silica gel shown on an enlarged scale.
Figure 4:
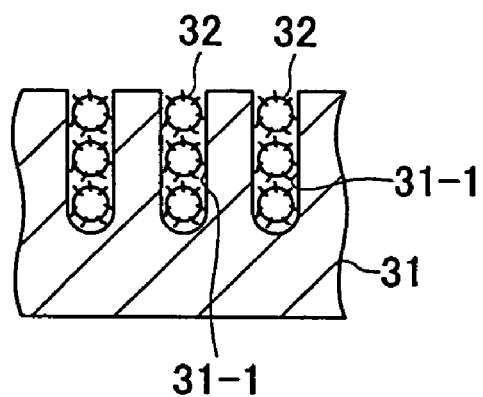
FIG. 4 is a diagram on an enlarged scale generally showing nano-particles embedded in holes.

Crystal Ordering of Nano-Particles:

Next, the crystal ordering of the FePt nano-particles is performed. FIG. 3 is a diagram showing an apparatus for embedding nano-particles in a silica gel in this first embodiment of the method of producing the magnetic recording medium, together with the silica gel shown on an enlarged scale. FIG. 4 is a diagram on an enlarged scale generally showing nano-particles embedded in holes.

In FIG. 3, approximately 3 g of silica gel 31 having holes 31-1 with an average diameter of 7.5 nm, for example, is added into a flask 30 containing FePt nano-particles 32 which are dispersed within the hexane, and agitated. The silica gel used may have holes 31-1 having an average diameter in a range of 2 nm to 20 nm. For example, Silica Gel CQ-3 manufactured by Wako Junyaku Kogyo of Japan may be used for the silica gel. It is of course possible to use a template having holes with an average diameter in the above-described range, in place of the silica gel. In this case, the holes in the template may be provided by carrying out a photolithography and etching process with respect to a surface of a silicon oxide layer, and fine holes may be provided by cathode oxidization of Alumilite. An aspect ratio of the holes 31-1, that is, (depth of holes 31-1)/(average diameter of holes 31-1), is preferably set in a range of 1 to 4, so that the FePt nano-particles 32 held within the holes 31-1 will not scatter when a thermal process which will be described later is carried out. Then, the flask 30 is left in a shelf for approximately 2 days at room temperature, so that the FePt nano-particles 32 fill the holes 31-1 in the silica gel 31 as shown in FIGS. 3 and 4.

Next, the silica gel 31 embedded with the FePt nano-particles 32 is removed from the flask 30 and put into a quartz container, and is heated for 30 minutes under a vacuum of $1.33 \times 10^{-4}$ Pa and a temperature of 800° C., for example, by a vacuum thermal process apparatus such as a furnace. The heating temperature may be set in a range of 400° C. to 900° C., and the heating time may be set in a range of 20 minutes to 60 minutes. By carrying out this thermal process, the crystals of the FePt nano-particles 32 are ordered from the fcc structure into the fct structure, and the FePt nano-particles 32 become ferromagnetic. In other words, hard magnetic FePt nano-particles are formed. The thermal process is carried out under vacuum, without the use of a gas environment. For example, if the thermal process is carried out in an Ar gas atmosphere, the Ar gas interacts with the organic stabilizers which make the FePt nano-particles 32 self-align. In this case, the organic stabilizers may be removed from between the FePt nano-particles 32 to cause contact or fusing of the FePt nano-particles 32. On the other hand, when the thermal process is carried out under the vacuum, the crystals can be ordered while maintaining the grain diameter and the grain diameter (or size) distribution of the FePt nano-particles 32 in the state after the above described synthesis. In addition, since the FePt nano-particles 32 are held within the holes 31-1 in the silica gel 31, it is possible to prevent the FePt nano-particles 32 from scattering when forming the vacuum atmosphere (or environment) and when carrying out the thermal process.

The hard magnetic FePt nano-particles are mutually bonded by the amorphous carbon which is generated when the organic stabilizers are sintered by the thermal process. However, because the thermal process is carried out in a state where the FePt nano-particles 32 are piled within the holes 31-1, the bonding of the mutually adjacent FePt nano-particles is weak, and the bond can easily be separated.

Next, under an Ar atmosphere, the silica gel 31 including the hard magnetic FePt nano-particles after the heating, is dipped into 99 vol. % hydrofluoric acid for approximately 60 minutes to dissolve the silica gel 31. The hydrofluoric acid solution in which the hard magnetic FePt nano-particles and the silica gel 31 are dissolved is separated by a centrifuge, so as to extract only the hard magnetic FePt nano-particles which are precipitated, using a spuit. The extracted hard magnetic FePt nano-particles are added with 5 ml of ethanol and cleaned by use of a centrifuge, so as to extract the precipitated hard magnetic FePt nano-particles.

Thereafter, the extracted hard magnetic FePt nano-particles, 0.32 ml (1.0 mmol) of oleic acid and 0.34 ml (1.0 mmol) of oleyl amine are put into a flask and agitated. Consequently, the hard magnetic FePt nano-particles are covered by the organic stabilizers such as the oleic acid and the oleyl amine. Then, 10 ml of hexane is added into the flask so as to disperse the hard magnetic FePt nano-particles. In this state, the hard magnetic FePt nano-particles are not magnetized and the magnetic cohesion is weak, thereby making it relatively easy to disperse the hard magnetic FePt nano-particles. By the above described process, it is possible form the hard magnetic FePt nano-particles which are dispersed within the hexane.

(Formation of Soft Magnetic Nano-Particles)

Next, a description will be given of a method of forming the soft-magnetic nano-particles 18 which form the intermediate layer 13 of the perpendicular magnetic recording medium 10. For example, an Fe complex, a reductant and a solvent are added in a flask under an Ar atmosphere. For example, 0.13 ml (1.0 mmol) of iron pentacarbonyl (Fe(CO)$_5$) is used as the Fe complex, 390 mg (1.5 mmol) of 1,2-hexadecanediol is used as the reductant, and 20 ml of dioctylether is used as the solvent.

Next, 0.32 ml (1.0 mmol) of oleic acid and 0.34 ml (1.0 mmol) of oleyl amine are added into the flask, and the solution within the flask is agitated for approximately 30 minutes at a temperature of approximately 230° C. As a result, soft magnetic $Fe_2O_3$ nano-particles are generated within the flask.

Then, the solution within the flask is cooled to room temperature. Further, 40 ml of ethanol is added into the flask, and a precipitation of the FePt nano-particles and the organic stabilizers is obtained by use of a centrifuge.

Next, hexane is added to the precipitation of the $Fe_2O_3$ nano-particles and the organic lubricants in the flask. As a result, it is possible to obtain $Fe_2O_3$ nano-particles which are dispersed within the hexane. Under the above described conditions, the $Fe_2O_3$ nano-particles obtained have an average grain diameter of 20 nm.

Soft magnetic NiFe (permalloy) nano-particles may be formed similarly using the above described Fe complex and an Ni complex such as nickel acetylacetonate (Ni(II) ($C_5H_7O_2$)$_2$).

(Formation of Magnetic Recording Medium)

Next, a description will be given of the method of producing the perpendicular magnetic recording medium 10. It is assumed for the sake of convenience that the substrate 11 has a disk shape. In other words, a disk-shaped crystalline glass substrate having a diameter of 2.5 inches, for example, is used for the substrate 11. For example, the soft magnetic back layer 12 which is made of FeSi is formed to a thickness of 200 nm by sputtering, on the disk-shaped substrate 11. Of course, the soft magnetic back layer 12 may be formed by other methods such as plating and CVD, as described above.

Thereafter, the intermediate layer 13 formed by the soft magnetic $Fe_2O_3$ nano-particles is formed by spin-coating or dipping.

FIG. 4 is a diagram generally showing a structure of a spin coater used to produce the perpendicular magnetic recording medium 10 of this first embodiment. A spin coater 35 shown in FIG. 4 includes a container 36 which can be sealed, a rotary shaft 39, nozzles 40 and 41, a carburetor 42, a vapor pressure sensor 43, a plurality of gas inlets 44, and a vacuum pump 45. The rotary shaft 39 has a hub part 38 within the container 36, and the substrate 11 having the soft magnetic back layer 12 formed thereon is fixed on the hub part 38 by vacuum suction. The nozzles 40 and 41 have turned to the space within the container 36. The nozzle 40 is provided to supply a coating liquid, and the nozzle 41 is provided to supply hexane. The carburetor 42 evaporates the hexane drops supplied from the nozzle 41. The vapor pressure sensor 43 detects the vapor pressure of the evaporated gas. The gas inlets 44 eject a gas into the space within the container 36 towards the substrate 11. The vacuum pump 45 is used for exhaustion of the gas in the space-within the container 3. The spin coater 35 further includes a pair of electromagnets 46 which confront each other via the substrate 11, so that a magnetic field can be applied perpendicularly to the surface of the substrate 11.

After fixing the substrate 11 on the hub part 38 of the spin coater 35 by vacuum suction, the substrate 11 is rotated at 300 rpm. The inside of the container 36 is sealed and exhausted to vacuum. Thereafter, 100 ml of hexane is introduced into the container 36 via the nozzle 32, and the carburetor 42 is heated to approximately 80° C. to evaporate the hexane, so that a hexane environment is obtained in advance within the container 36.

Next, 200 µl of a coating liquid with a concentration of 10 mg/ml, which has the $Fe_2O_3$ nano-particles and an organic compound of carboxylic acid and amine dispersed within a hexane solvent, is dropped in 5 seconds via the nozzle 40.

Figure 5:
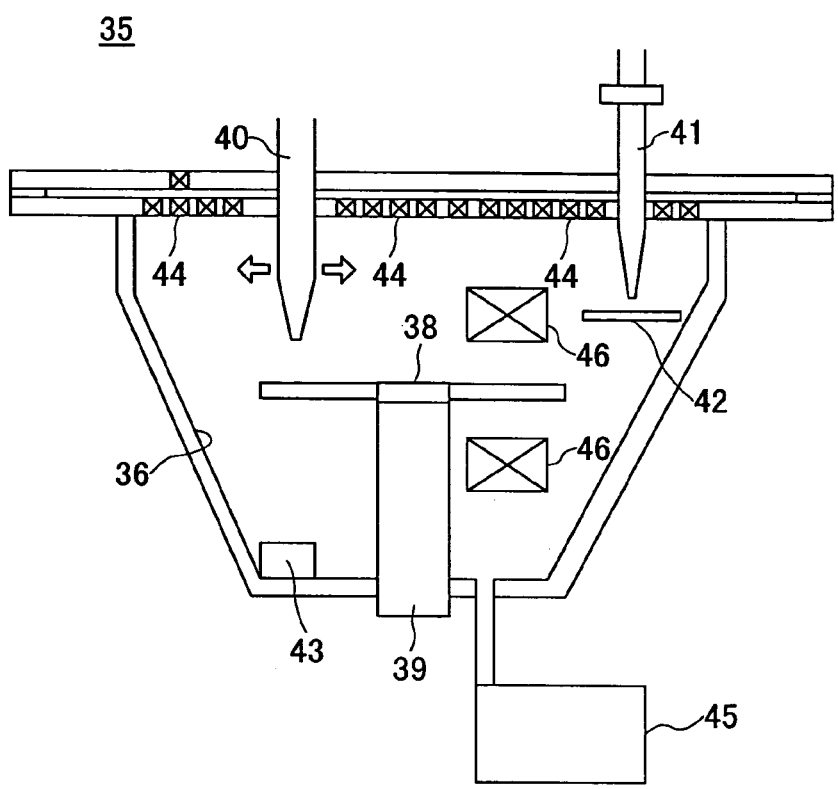
FIG. 5 is a diagram generally showing a structure of a spin coater used to produce the first embodiment of the magnetic recording medium.

The coating liquid is dropped by rotating the substrate 11 at a relatively slow speed of 60 rpm while moving the nozzle 40 in a radial direction of the substrate 11 at a speed of 0.5 cm/sec as indicated by arrows in FIG. 5. As a result, the coating liquid is dropped in a spiral fashion with respect to the substrate 11.

Then, the substrate 11 is rotated at 1000 rpm for 10 seconds, so as to spread the coating liquid over the entire surface of the substrate 11. Of course, the coating liquid is spread over the entire surface of the soft magnetic back layer 12 if provided. During this spin-coating process, the inside of the container 36 is filled with the hexane vapor, and the hexane within the coating liquid will not volatilize.

Next, in order to dry the residual hexane on the surface of the substrate 11, nitrogen gas is introduced into the container 36 via the gas inlets 44 at a flow rate of 10 sccm for 120 seconds, while rotating the substrate 11 at 300 rpm. As a result, the hexane within the coating liquid is evaporated.

Because the plurality of gas inlets 44 are generally distributed uniformly in-plane, the nitrogen gas uniformly hits the entire surface of the substrate 11. For this reason, the evaporation of the hexane occurs slowly and uniformly on the entire surface of the substrate 11, and it is possible to form a nano-particle layer in which the soft magnetic $Fe_2O_3$ nano-particles are arranged in an orderly fashion with a uniform thickness.

Figure 6:
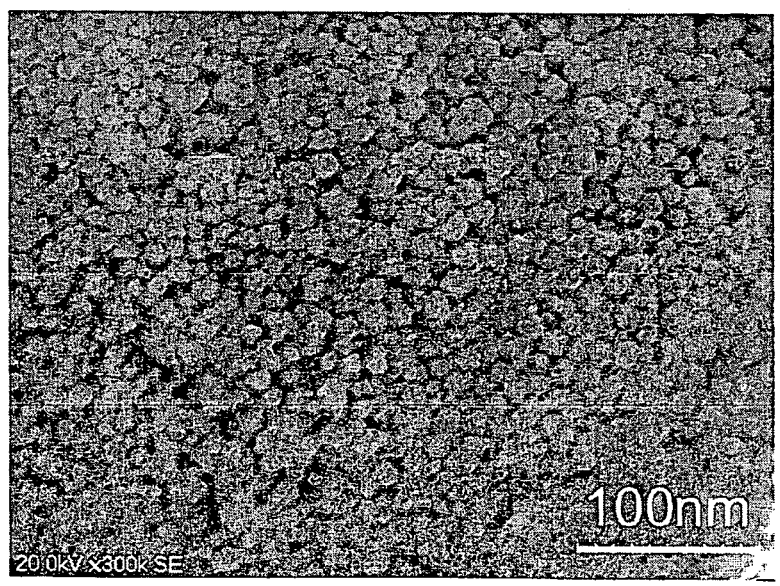
FIG. 6 is an SEM photograph of a surface of an intermediate layer made of $Fe_2O_3$ soft magnetic nano-particles in the first embodiment of the magnetic recording medium.

FIG. 6 is an SEM photograph of the surface of the intermediate layer 13 which is made of $Fe_2O_3$ soft magnetic nano-particles 18 in the first embodiment of the magnetic recording medium. As may be seen from FIG. 6, it was confirmed that the soft magnetic $Fe_2O_3$ nano-particles 18 are arranged in an orderly fashion with a uniform thickness.

Thereafter, the recording layer 14, which is formed by the hard magnetic nano-particles 20, is formed by spin-coating or dipping. The recording layer 14 is formed similarly to the intermediate layer 13 which is formed by the soft magnetic nano-particles 18, except that the hard magnetic nano-particles 20 are oriented by applying a magnetic field. More particularly, the inside of the container 36 is sealed and exhausted to vacuum. Thereafter, 100 ml of hexane is introduced into the container 36 via the nozzle 32, and the carburetor 42 is heated to approximately 80° C. to evaporate the hexane, so that a hexane environment is obtained in advance within the container 36.

Next, 200 µl of a coating liquid with a concentration of 10 mg/ml, which has the FePt nano-particles and an organic compound of carboxylic acid and amine dispersed within a hexane solvent, is dropped in 5 seconds via the nozzle 40.

The coating liquid is dropped by rotating the substrate 11 at a relatively slow speed of 60 rpm while moving the nozzle 40 in a radial direction of the substrate 11 at a speed of 0.5 cm/sec as indicated by arrows in FIG. 5. As a result, the coating liquid is dropped in a spiral fashion with respect to the substrate 11.

Then, the substrate 11 is rotated at 1000 rpm for 10 seconds, so as to spread the coating liquid over the entire surface of the substrate 11. Of course, the coating liquid is spread over the entire surface of the soft magnetic back layer 12 if provided. During this spin-coating process, the inside of the container 36 is filled with the hexane vapor, and the hexane within the coating liquid will not volatilize.

The electromagnets 46 of the spin coater 35 are thereafter turned ON, so as to apply a magnetic field of $7.9 \times 10^3$ A/m to $1.58 \times 10^4$ A/m (1000 Oe to 2000 Oe) with respect to the substrate 11, in a direction approximately perpendicular to the surface of the substrate, in a state where the substrate 11 is rotated at 60 rpm, for example. The magnetic field is applied from the top to bottom in FIG. 5, for example. By applying this magnetic field, the axes of easy magnetization of the hard magnetic nano-particles 20 of the recording layer 14 can be oriented in the direction approximately perpendicular to the surface of the substrate 11. The magnitude of the magnetic field that is applied is desirably as small as possible within a range which is sufficient to rotate the axes of easy magnetization of the hard magnetic nano-particles 20 of the recording layer 14. If the hard magnetic nano-particles 20 are strongly magnetized, the remanent magnetization becomes large and the magnetic cohesion increases. At the same time, in order to dry the residual hexane on the surface of the substrate 11, nitrogen gas is introduced into the container 36 via the gas inlets 44 at a flow rate of 10 sccm for 120 seconds. As a result, the hexane within the coating liquid is evaporated. The magnetic field may be applied continuously from the time when the coating liquid is dropped until the residual hexane is dried. Further, permanent magnets may be used in place of the electromagnets 46.

Of course, the electromagnets 46 may be provided outside the container 36, so as to surround the container 36. In this case, it is possible to uniformly apply the magnetic field on the substrate 11.

By carrying out the above-described process, it is possible to form the recording layer 14 having a thickness of 10 nm, in which the hard magnetic FePt nano-particles 20 are arranged in an orderly fashion.

Next, a planarization and heating process is carried out with respect to the surface of the recording layer 14. For example, in an inert gas environment such as a nitrogen gas atmosphere, the planarization and heating process is carried out at a temperature in a range of 100° C. to 300° C., for a time in a range of 1 minute to 60 minutes. As a result, the soft magnetic nano-particles 18 of the intermediate layer 13 and the hard magnetic nano-particles 20 of the recording layer 14 are uniformly distributed, and the surfaces of the intermediate layer 13 and the recording layer 14 become further planarized. The planarization and heating process may be carried out after forming each of the intermediate layer 13 and the recording layer 14. When carrying out the planarization and heating process, a magnetic field may be applied on the substrate 11 similarly as the process forming the recording layer 14. The planarization and heating process may be omitted.

Next, a thermal process is carried out to transform the organic stabilizers into the carbon phase made up of amorphous carbon, and to fix the soft magnetic nano-particles 18 and the hard magnetic nano-particles 20. The substrate 11 having the layers to the recording layer 14 stacked thereon, is placed within a chamber of a thermal process apparatus, and the inside of the chamber is exhausted to vacuum of approximately $10^{-5}$ Pa before carrying out the thermal process at a heating temperature of 350° C. for 30 minutes, for example. The heating temperature may be set in a range of 300° C. to 550° C., and preferably in a range of 300° C. to 400° C. Compared to the conventional method which orders the crystals after forming the recording layer which is made up of the nano-particles, this embodiment can set the heating temperature to a lower temperature. By setting the heating temperature to 400° C. or less, it is possible to prevent crystallization or, growth of crystal grains, of the amorphous or microcrystalline material forming the soft magnetic back layer 12, to thereby avoid the high-frequency permeability from decreasing. Furthermore, it becomes possible to use crystalline glass substrates, reinforced glass substrates, silicon (Si) substrates, polyamide films, and the like for the substrate 11. The heating time may be set in a range of 10 minutes to 120 minutes.

Then, the protection layer 15 is formed on the recording layer 14. For example, the protection layer 15 is formed within a sputtering apparatus by forming hydro-carbon to a thickness of 5 nm in a gas mixture atmosphere of hydrogen and Ar, in which the hydrogen gas partial pressure is adjusted. The protection layer 15 may be formed by methods other than sputtering, such as CVD and Filtered Cathode Arc (FCA).

Next, the lubricant layer 16 is formed on the protection layer 15. For example, the lubricant layer 16 is formed by a flon solvent including AM3001 manufactured by Ausimonoto, to a thickness of 3 nm, by dipping, lifting, dropping or the like.

By carrying out the processes described above, the perpendicular magnetic recording medium 10 is produced.

According to this embodiment, the thermal process to order the nano-particles. (crystals) is carried out before coating the hard magnetic nano-particles on the substrate surface. For this reason, the substrate and the soft magnetic back layer will not be subjected to a high temperature environment for the purposes of ordering the crystals. Consequently, it is possible to avoid the high-frequency permeability of the soft magnetic back layer from decreasing.

Next, a description will be given of a second embodiment of the method of producing the magnetic recording medium according to the present invention. It is assumed for the sake of convenience that this second embodiment of the method produces the perpendicular magnetic recording medium 10 shown in FIG. 1. This second embodiment of the method is characterized by a crystal ordering process which orders the crystals of the nano-particles, and other processes may be the same as those of the first embodiment of the method described above. For this reason, a description of the processes other than the crystal ordering process will be omitted.

In the crystal ordering process of this embodiment of the method, the nano-particles formed similarly to the first embodiment of the method are adhered on the surface of water-soluble salt in place of the silica gel.

Figure 7:
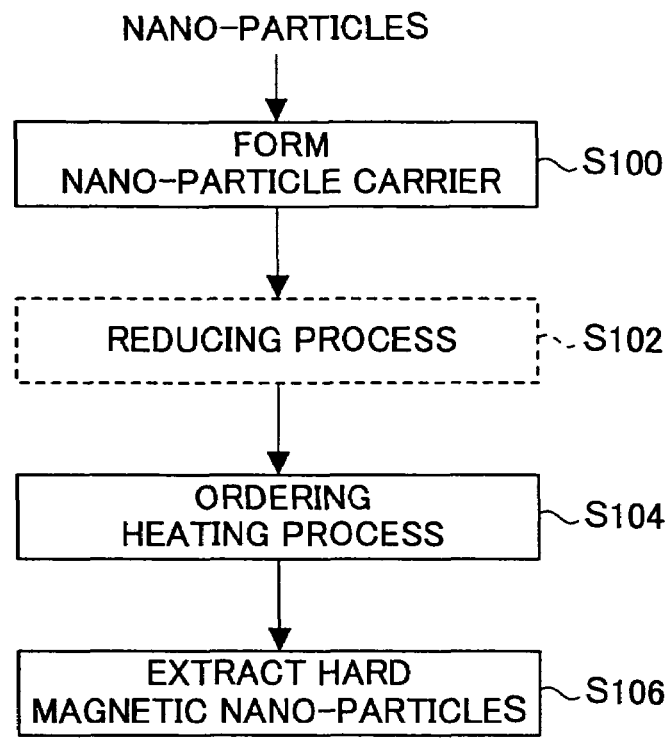
FIG. 7 is a flow chart for explaining a crystal ordering process of a second embodiment of the method of producing the magnetic recording medium according to the present invention.

FIG. 7 is a flow chart for explaining the crystal ordering process of the second embodiment of the method of producing the magnetic recording medium according to the present invention.

First, a step S100 shown in FIG. 7 forms a nano-particle carrier. More particularly, water-soluble salt is added to an organic solvent, such as hexane, in which nano-particles are dispersed, in a flask, and agitated. The flask is left in a shelf for approximately 30 minutes. As a result, the nano-particle carrier having the nano-particles adhered on the surface of the water-soluble salt is formed. The water-soluble salt is not limited to a specific salt. However, anhydrous salt obtained by dehydrating crystal water from crystal water salt (hydrated salt), such as $MgSO_4$ obtained by dehydrating crystal water from $MgSO_4.7H_2O$ (magnesium sulfate 7-hydrate), is preferable in that the surface energy is high and the nano-particles easily adhere. Sulfates of $MgSO_4$, $Na_2SO_4$, $PdSO_4$, $(NH_4)_2MgSO_4(III)$, $Ce(III)SO_4$, $NiSO_4$, $CdSO_4$ or the like, and nitrates of $Ca_2(NO_3)_2$, $Sr(NO_3)_2$ and the like, may be used as the anhydrous salt. $MgSO_4$ and $Na_2SO_4$ are particularly suited for use as the anhydrous salt because of the large amount of nano-particles which adhere per unit volume.

Figure 8:
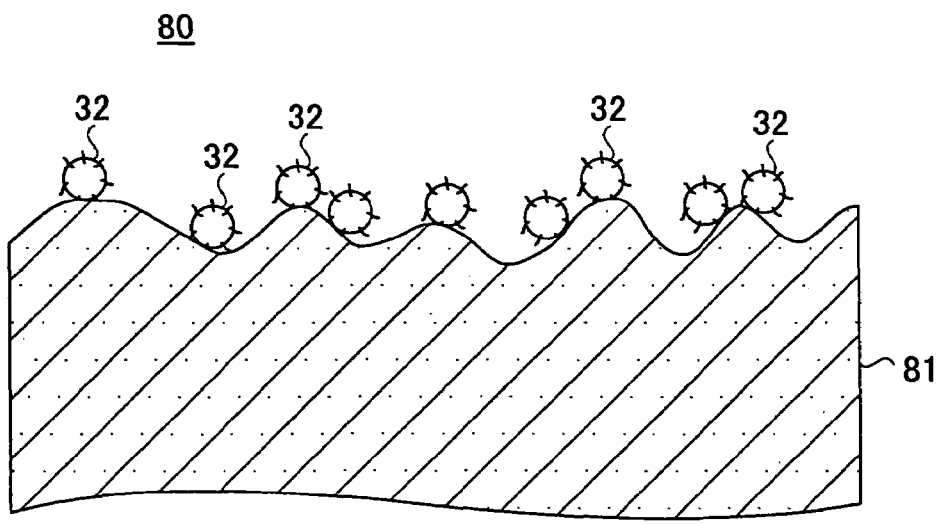
FIG. 8 is a diagram on an enlarged scale generally showing a nano-particle carrier in a state where nano-particles are adhered thereon.

FIG. 8 is a diagram on an enlarged scale generally showing the nano-particle carrier in a state where the nano-particles are adhered thereon. In FIG. 8, nano-particles 32 are adhered on the surface of a water-soluble salt 81. According to studies made by the present inventors, it was confirmed that the amount of the nano-particles 32 which adhere on the surface of the water-soluble salt 81 increases when pores having fine undulations or apertures on the order of several nm are formed at the surface of the water-soluble salt 81. The undulations at the surface of the water-soluble salt 81 are formed when the crystal water is hydrated from the hydrated salt.

Preferably, the amount of water-soluble salt added with respect to 1 volume part of the nano-particles is 20 volume parts or greater. If the amount of water-soluble salt added is less than 20 volume parts, the nano-particles pile on top of the other at the surface of the water-soluble salt and the nano-particles may fuse together. On the other hand, the maximum amount of the water-soluble salt added with respect to 1 volume part of the nano-particles is not limited to a specific value, but from the point of view of treating the nano-particle carrier and efficiently utilizing the water-soluble salt, the maximum amount of water-soluble salt added with respect to 1 volume part of the nano-particles is preferably 400 volume parts or less.

Returning now to the description of FIG. 7, a step S104 evaporates the organic solvent, moves the nano-particle carrier into a quartz container and carries out an ordering heating process. The ordering heating process uses a vacuum thermal process apparatus, and the nano-particle carrier is heated under a vacuum of $1.33 \times 10^{-4}$ Pa at a temperature of 800° C. for 30 minutes. By this ordering heating process, crystals of the FePt nano-particles are ordered from the fcc structure into the fct structure, thereby making the nano-particles ferromagnetic and forming the hard magnetic nano-particles. In this ordering heating process, the heating temperature may be set in a range of 500° C. to 900° C., and the heating time may be set in a range of 20 minutes to 60 minutes. By carrying out the ordering heating process under vacuum, the crystals can be ordered while maintaining the grain diameter and the grain diameter (or size) distribution of the FePt nano-particles 32 in the state after the above described synthesis.

Next, a step S106 cools the nano-particle carrier and extracts the hard magnetic nano-particles. For example, the hard magnetic nano-particles may be extracted by adding a solvent including 0.1 ml of oleic acid and 10 ml of hexane with respect to 100 mg of hard magnetic nano-particles and water-soluble salt, agitating the mixture, and dissolving the water-soluble salt by adding an amount of water approximately the same as the amount of hexane and agitating. Thereafter, the aqueous phase is separated by a separating funnel, and a cleaning is performed using ethanol to remove water, before dispersing the hard magnetic nano-particles in hexane. The hard magnetic nano-particles dispersed in hexane are obtained in this manner.

According to this embodiment, the water-soluble salt is used for the nano-particle carrier to which the nano-particles adhere. Hence, by dissolving the water-soluble salt in water, it is possible to extract the hard magnetic nano-particles by a simple and easy process without affecting the hard magnetic nano-particles. In addition, the time required to form the nano-particle carrier is reduced compared to the first embodiment of the method which uses the silica gel, and it is also possible to reduce the processing time of the crystal ordering process carried out with respect to the nano-particles.

Next, a description will be given of a first modification of the second embodiment of the method. In this first modification, the nano-particle carrier is heated in a reduction atmosphere instead of vacuum when carrying out the ordering heating process of the step S104 shown in FIG. 7. Otherwise, this first modification is the same as the second embodiment of the method.

In the ordering heating process of this first modification, the nano-particle carrier within a quartz container is heated in a reducing atmosphere such as an Ar gas atmosphere including hydrogen gas in a range of 1 vol. % to 7 vol. %, at a pressure in a range of $1.01 \times 10^4$ Pa to $1.52 \times 10^5$ Pa, a heating temperature in a range of 500° C. to 900° C. (preferably 550° C. to 650° C.), and for a heating time in a range of 20 minutes to 60 minutes.

An oxide layer is formed on the surface of the nano-particles due to natural oxidation and the like. Such an oxide layer suppresses scattering of metal atoms forming the nano-particles when ordering the crystals, and increases the activation energy for the ordering, that is, increases the ordering temperature. But by using the hydrogen gas, the oxide layer can be transformed into the same alloy as the inside of the nano-particles due to the reducing function of the hydrogen gas, and it is possible to both facilitate the scattering of the metal atoms and to reduce the ordering temperature. According to the studies made by the present inventors, it was confirmed that, compared to a case where the ordering heating process is carried out under vacuum as in the second embodiment of the method, it is possible to reduce the heating temperature by approximately 200° C. when obtaining hard magnetic nano-particles of approximately the same ordering. In other words, the ordering state obtained by the ordering heating process of the second embodiment of the method carried out at the temperature in a range of 800° C. to 900° C., can be obtained by the ordering heating process of this first modification at the temperature in a range of 600° C. to 700° C.

In addition, the concentration of the hydrogen gas is not limited to the range of 1 vol. % to 7 vol. %. The concentration of the hydrogen gas is desirably high, as long as safety is secured, and may be 100 vol. %, for example. Moreover, the rare gas used is not limited to the Ar gas, and the rare gas used may be selected from Ar, He, Ne, Kr and Xe or an arbitrary combination of two or more such gasses may be used.

For example, 3 mg of FePt nano-particles (Fe: 50 at. %, Pt: 50 at. %) and 60 mg of $MgSO_4$ forming the nano-particle carrier, within hexane, are moved into a quartz container together with the hexane, and the hexane is evaporated. Then, the heating process is carried out in an Ar gas atmosphere including 3 vol. % of hydrogen gas, at a temperature of 700° C. and a pressure of $1.01 \times 10^5$ Pa for 30 minutes. An X-ray analysis using a $2\theta/\theta$ scan was made by an X-ray defractometer with respect to the hard magnetic nano-particles obtained by this process, together with the $MgSO_4$.

Figure 9:
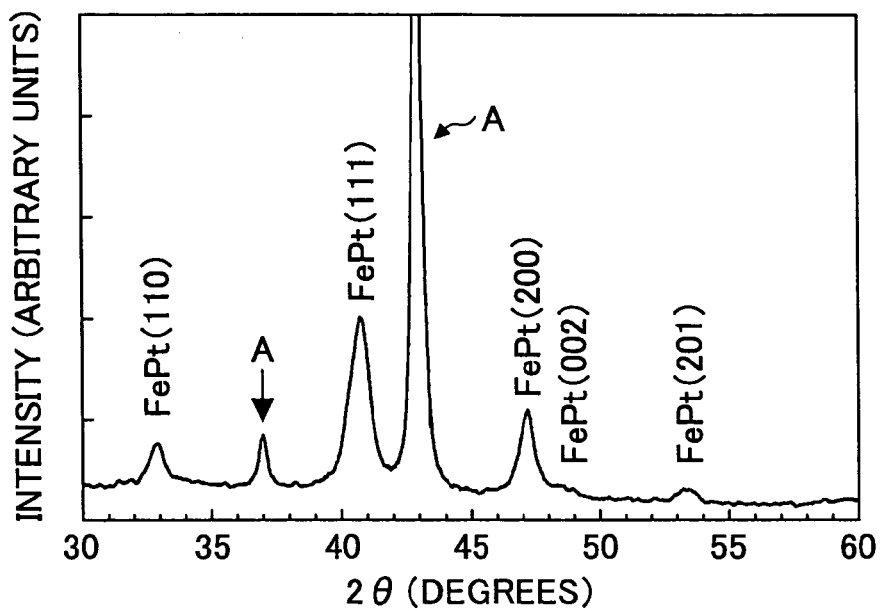
FIG. 9 is a diagram showing an X-ray analysis pattern of the hard magnetic nano-particles.

FIG. 9 is a diagram showing an X-ray analysis pattern of the ordered nano-particles, that is, the hard magnetic nano-particles. In FIG. 9, the ordinate indicates the intensity in arbitrary units, and the abscissa indicates $2\theta$ in degrees. As may be seen from FIG. 9, peaks of the FePt having the fct structure appear at the (110) face ($2\theta=33.1$ degrees), (111) face ($2\theta=40.7$ degrees), (200) face ($2\theta=47.1$ degrees), (002) face ($2\theta=48.7$ degrees), and (201) face ($2\theta=53.4$ degrees), and it can be seen that the hard magnetic nano-particles have the fct structure. In FIG. 9, a peak A is caused by the $MgSO_4$.

According to this first modification, it is possible to form the hard magnetic nano-particles having the fct structure, which are ordered at the heating temperature which is lower than the heating temperature in vacuum, by carrying out the heating process in the hydrogen-gas-containing atmosphere during the ordering heating process.

Next, a description will be given of a second modification of the second embodiment of the method. In place of the ordering heating process of the first modification carried out under the reducing atmosphere, this second modification carries out a reducing process in a step S102 shown in FIG. 7. The step S102 is carried out after the step S100 which forms the nano-particle carrier, in a reducing atmosphere at a heating temperature lower than that of the first modification. The ordering heating process of the step S104 is carried out after the step S102. Otherwise, this second modification is the same as the second modification of the second embodiment of the method.

In the reducing process of this second modification, the step S102 heats the nano-particle carrier within the quarts container within the hydrogen-gas-containing atmosphere, at a pressure in a range of $5.07 \times 10^4$ Pa to $1.52 \times 10^5$ Pa and a heating temperature in a range of 100° C. to 450° C. for a heating time in a range of 20 minutes to 120 minutes, so as to reduce the oxide layer on the surface of the nano-particles and transform the oxide layer into the alloy forming the nano-particles.

Then, the hydrogen-gas-containing rare gas is exhausted, and the step S104 carries out the ordering heating process in vacuum. The order heating process may be carried out at a pressure of $5.07 \times 10^4$ Pa, a heating temperature in a range of 500° C. to 900° C. (preferably 600° C. to 700° C.), and for a heating time in a range of 20 minutes to 60 minutes, to heat the nano-particle carrier and order the nano-particles (crystals). According to the studies made by the present inventors, it was confirmed that, compared to a case where the ordering heating process is carried out under vacuum as in the second embodiment of the method, it is possible to reduce the heating temperature by approximately 200° C. when obtaining hard magnetic nano-particles of approximately the same ordering. In other words, the ordering state obtained by the ordering heating process of the second embodiment of the method carried out at the temperature in a range of 800° C. to 900° C., can be obtained by the ordering heating process of this second modification at the temperature in a range of 600° C. to 700° C.

According to this second modification, it is possible to further suppress thermal fusion of the nano-particles, by carrying out the ordering heating process under vacuum.

Next, a description will be given of a third modification of the second embodiment of the method. This third modification omits the process of the second embodiment of the method for forming the nano-particle carrier. This third modification carries out the reducing process with respect to the nano-particles within an organic solvent, then carries out the ordering heating process with respect to the reduced nano-particles within the organic solvent, and thereafter carries out the extraction process to extract the hard magnetic nano-particles.

In other words, the reducing process and the ordering heating process of this third modification are carried out with respect to the nano-particles, continuously within the organic solvent including the reductant. In addition, by using the organic solvent having a high boiling point, the reducing process and the ordering heating process can be carried out within the organic solvent. Furthermore, it is possible to prevent the surface of the reduced nano-particles from being oxidized, and order the nano-particles (crystals) at a low heating temperature.

First, in the reducing process, the nano-particles, an organic solvent such as dioctylether, and a reductant are added, so as to disperse the nano-particles in the solution. A known reductant may be used and the reductant is not limited to a specific reductant. For example, boranes described by $LiAlH_4$, $Li(C_2H_5)_3BH$, $BH_3$, $B_xH_y$ (where x is an integer greater than or equal to 2, and y=2×x), and hydrides such as $NaH$, $KH$ and $CaH_2$ may be used as the reductant. For example, 20 mg of NaH is added to the dioctylether, 10 mg of nano-particles are added and agitated, and heating at a heating temperature of 100° C. is carried out for 10 minutes, so as to reduce the surface of the nano-particles. The reducing process may be carried out at a heating temperature in a range of 50° C. to 200° C. for a heating time in a range of 5 minutes to 20 minutes.

Thereafter, the organic solvent including the reduced nano-particles is heated to 300° C. for 30 minutes and agitated while heating, for example, so as to carry out the ordering heating process with respect to the nano-particles. Since the surface of the nano-particles is reduced, the nano-particles are ordered into the fct structure at this relatively low heating temperature, and the hard magnetic nano-particles are formed. The heating temperature may be set in a range of 250° C. to 400° C. and the heating time may be set in a range of 20 minutes to 60 minutes for the ordering heating process. The organic solvent which is used for the reducing process and the ordering heating process, when carrying out these processes under atmospheric pressure, is preferably selected from ethers having a carbon number which is 10 or greater but 20 or less, when the boiling point is take into consideration.

The organic solvent including the hard magnetic nano-particles is then added with alcohol, such as ethanol, to form a precipitation and obtain the precipitation by removing the supernatant liquid. The precipitation is further cleaned by ethanol. By such processes, it is possible to virtually eliminate the reaction residue. Moreover, the precipitation obtained in this manner may be dispersed within hexane which is added with oleic acid, and the supernatant liquid may be obtained by use of a centrifuge, so as to obtain a hexane solution in which the hard magnetic nano-particles are dispersed.

According to this third modification, the reducing process and the ordering heating process can be carried out within the organic solvent, instead of carrying out a vacuum process which is expensive to perform. For this reason, it is possible to reduce the production cost, and to simplify the ordering process.

Furthermore, in the third modification, the heating temperature of the reducing process and the heating temperature of the ordering heating process may be set to the same heating temperature. In this case, it is possible to simultaneously carry out the reducing process and the ordering heating process.

In the process of forming the nano-particles, which is carried out before the crystal ordering process, the reducing process may be carried out by adding the reductant and the organic solvent into the flask in which the generated nano-particles and the reaction residue of the Pt complex and the reductant remain. In this case, it is possible to omit the process of separating the reaction residue by the centrifuge during the process of forming the hard magnetic nano-particles. Moreover, in order to further enhance the ordering, it is possible to carry out the ordering heating process with respect to the nano-particles within vacuum, similarly to the second modification of the second embodiment of the method.

Next, a description will be given of an embodiment of a magnetic storage apparatus according to the present invention.

Figure 10:
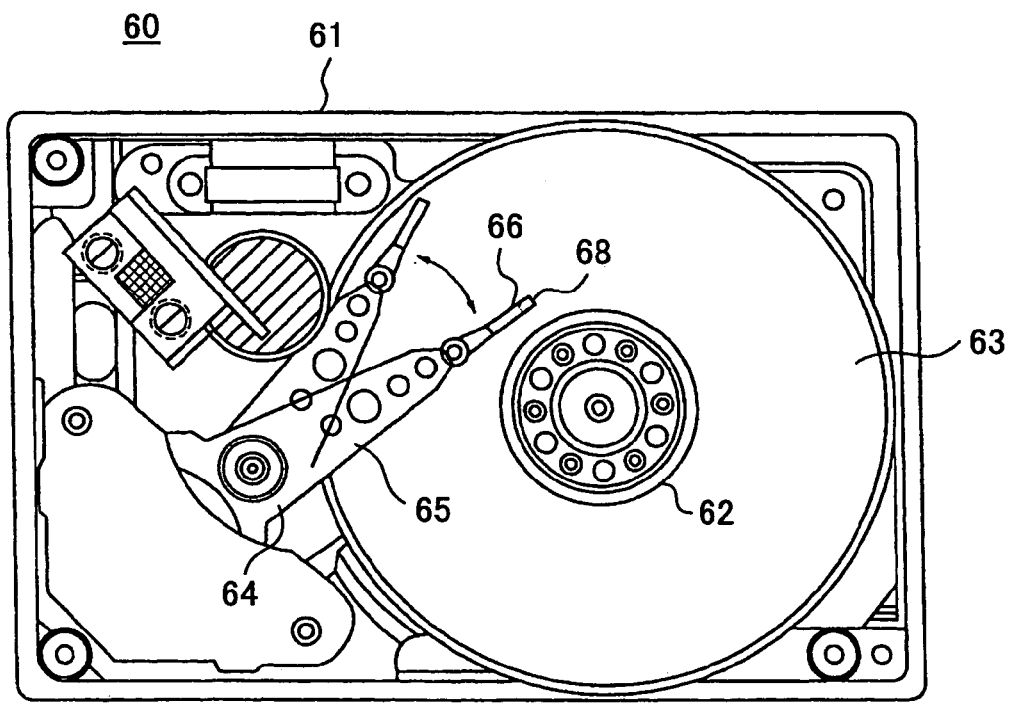
FIG. 10 is a plan view showing a part of an embodiment of a magnetic storage apparatus according to the present invention.

FIG. 10 is a plan view showing a part of this embodiment of a magnetic storage apparatus according to the present invention. A magnetic storage apparatus 60 shown in FIG. 10 is generally formed by a housing 61. A hub 62 which is driven by a spindle motor (not shown), a perpendicular magnetic recording medium 63 which is fixed to and is rotated by the hub 62, an actuator unit 64, an arm 65, a suspension 66, and a perpendicular magnetic recording head 68. In this embodiment, the perpendicular magnetic recording medium 63 has a disk shape. The arm 65 is moved in a radial direction of the disk-shaped perpendicular magnetic recording medium 63 by the actuator unit 64. The suspension is provided on the arm 65, and the perpendicular magnetic recording head 68 is supported on a type end of the suspension 66. Of course, two or more perpendicular magnetic recording media 63 may be provided, and a corresponding number of arms 65, suspensions 66 and perpendicular magnetic recording heads 68 are provided in this case.

Figure 11:
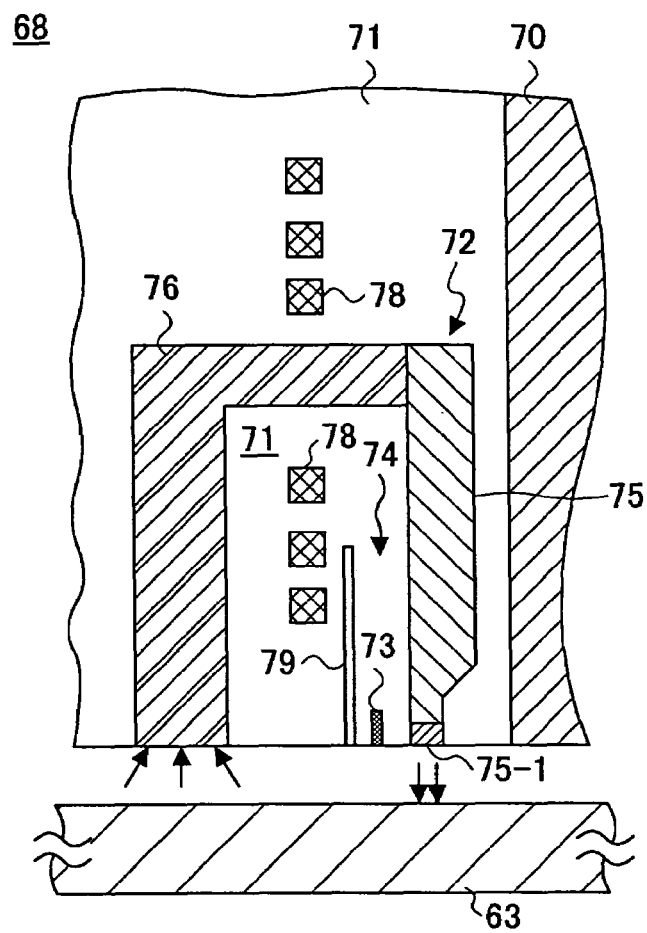
FIG. 11 is a cross sectional view generally showing a perpendicular magnetic recording head.
Figure 12:
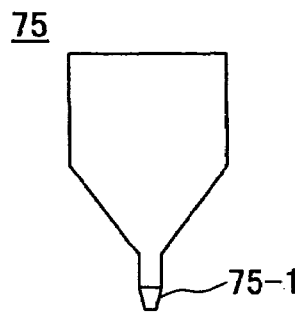
FIG. 12 is a diagram on an enlarged scale showing a main magnetic pole of the perpendicular magnetic recording head.

FIG. 11 is a cross sectional view generally showing the perpendicular magnetic recording head 68, and FIG. 12 is a diagram on an enlarged scale showing a main magnetic pole of the perpendicular magnetic recording head 68.

As shown in FIG. 11, the perpendicular magnetic recording head 68 includes a single-pole recording head 72 and a reproducing head 74 which uses a Giant Magneto Resistive (GMR) element 73, provided on an slider 70 via an alumina insulator layer 71. The single-pole recording head 72 includes a main pole 75 made of a soft magnetic material for applying a recording magnetic field to the perpendicular magnetic recording medium 63, a return yoke 76 which is magnetically connected to the main pole 75, and a recording coil 78 for inducing the recording magnetic field to the main pole 75 and the return yoke 76. The reproducing head 74 uses the main pole 75 as a lower shield. The GMR element 73 is formed on a main pole 74 via the alumina insulator layer 71. The reproducing head 74 has an upper shield 79 which is formed via the alumina insulator layer 71. The single-pole recording head 72 applies the recording magnetic field from the main pole 75 in a direction perpendicular to the surface of the perpendicular magnetic recording medium 63, and forms the perpendicular magnetization in the perpendicular magnetic recording medium 63.

As shown in FIG. 12, a tip end part 75-1 of the main pole 75 is narrower towards the tip, that is, has a cross sectional area which decreases towards the tip. Hence, it is possible to increase the magnetic flux density associated with the recording magnetic field, and magnetize the perpendicular magnetic recording medium 63 having a high perpendicular coercivity. The soft magnetic material forming the tip end part 75-1 of the main pole 75 has a high saturation magnetic flux density, and is preferably 50 at. % Ni-50 at. % Fe, FeCoNi alloy, FeCoAlO alloy or the like. By using such soft magnetic materials for the tip end part 75–1, it is possible to prevent magnetic saturation and to concentrate a magnetic flux having a high magnetic flux density to be applied to the perpendicular magnetic recording medium 63.

The reproducing head 74 senses the leakage magnetic field from the magnetization of the perpendicular magnetic recording medium 63, and obtains the information recorded on the perpendicular magnetic recording medium 63 from a change in resistance of the GMR element 73 corresponding to the direction of the sensed magnetic field. Of course, it is possible to use a Ferromagnetic Tunnel Junction Magneto Resistive (TMR) element in place of the GMR element 73, for example.

The magnetic storage apparatus 60 of this embodiment is characterized by the perpendicular magnetic recording medium 63. The perpendicular magnetic recording medium 63 may be any of the embodiments of the magnetic recording medium described above, which may be produced by any of the embodiments of the method described above.

Of course, the basic structure of the magnetic storage apparatus 60 is not limited to that shown in FIG. 9. In addition, the perpendicular magnetic recording medium 63 is not limited to a magnetic disk, and may take the form of a magnetic tape, for example.

According to the magnetic storage apparatus 60 of this embodiment, it is possible to carry out a high-density recording because the recording layer of the perpendicular magnetic recording medium 63 has a high-output and low-noise characteristic. Moreover, it is possible to operate the magnetic storage apparatus 60 with a high reliability for a long time, because of the stable thermal stability of the perpendicular magnetic recording medium 63.

Further, the present invention is not limited to these embodiments, but various variations and modifications may be made without departing from the scope of the present invention.

What is claimed is:

1. A method of producing a magnetic recording medium having a recording layer made of hard magnetic nano-particles, comprising the steps of:
    (a) forming nano-particles;
    (b) heating the nano-particles and ordering crystals thereof to transform the nano-particles into hard magnetic nano-particles;
    (c) forming the recording layer, after said step (b), by coating the hard magnetic nano-particles obtained by said step (b) on a surface and applying a magnetic field in a direction approximately perpendicular to the surface to orient the hard magnetic nano-particles.

2. The method as claimed in claim 1, wherein said step (b) uses a template having holes, and carries out an ordering heating process which fills the nano-particles into the holes and heats the template.

3. The method as claimed in claim 2, wherein the holes in the templates have a diameter in a range of 2 nm to 20 nm.

4. The method as claimed in claim 3, wherein the template comprises silica gel.

5. The method as claimed in claim 2, wherein said step (b) dissolves the template after the ordering heating process so as to extract the nano-particles.

6. The method as claimed in claim 1, wherein said step (b) comprises:

a carrier forming process to form a nano-particle carrier by adhering the nano-particles on a surface of a water-soluble salt;
an ordering heating process to heat the nano-particle carrier and to transform the nano-particles into hard magnetic nano-particles with ordered crystal; and
an extracting process to dissolve the water-soluble salt and extract the hard magnetic nano-particles.

7. The method as claimed in claim 6, wherein said ordering heating process heats the nano-particle carrier within a vacuum atmosphere or an atmosphere containing hydrogen gas.

8. The method as claimed in claim 6, wherein said step (b) further comprises:
    a reducing process to reduce a surface of the nano-particles, carried out between the carrier forming process and the ordering heating process.

9. The method as claimed in claim 8, wherein said reducing process is carried out within an atmosphere containing hydrogen gas and heats the nano-particle carrier to a temperature in a range of 100° C. to 450° C., and said ordering heating process is carried out within a vacuum atmosphere and heats the nano-particle carrier to a temperature in a range of 500° C. to 900° C.

10. The method as claimed in claim 6, wherein the water-soluble salt is anhydrous salt dehydrated of crystal water.

11. The method as claimed in claim 10, wherein the anhydrous salt is selected from a group consisting of $MgSO_4$, $Na_2SO_4$, $PdSO_4$, $(NH_4)_2MgSO_4(III)$, $Ce(III)SO_4$, $NiSO_4$, $CdSO_4$, $Ca_2(NO_3)_2$ and $Sr(NO_3)_2$.

12. The method as claimed in claim 1, wherein said step (b) comprises:
    a reducing process to reduce a surface of the nano-particles;
    an ordering heating process to heat the nano-particle carrier and to transform the nano-particles into hard magnetic nano-particles with ordered crystal; and
    an extracting process to extract the hard magnetic nano-particles,
    said reducing process heating the nano-particles within an organic solvent containing a reductant, at a temperature in a range of 50° C. to 200° C.,
    said ordering heating process heating the nano-particles within the organic solvent at a temperature in a range of 250° C. to 400° C.

13. The method as claimed in claim 12, wherein the reductant is made of a hydride selected from a group consisting of boranes described by $LiAlH_4$, $Li(C_2H_5)_3BH$, $BH_3$, $B_xH_y$ (where x is an integer greater than or equal to 2, and y =2x), and hydrides described by NaH, KH and $CaH_2$.

14. The method as claimed in claim 12, wherein said reducing process is carried out by adding the reductant and the organic solvent to the nano-particles generated by said step (a), before separating the nano-particles.

15. The method as claimed in claim 1, wherein said step (c) comprises:
    a coating process to coat on the surface an organic solvent including the hard magnetic nano-particles; and
    an orienting process to orient the axes of easy magnetization of the hard magnetic nano-particles by applying a magnetic field in the direction approximately perpendicular to the surface.

16. The method as claimed in claim 1, wherein said step (c) comprises:
    a fixing process to fix the hard magnetic nano-particles by further heating the recording layer with the oriented hard magnetic nano-particles to a temperature in a range of 300° C. to 550° C.

17. The method as claimed in claim 1, wherein said step (b) heats the nano-particles at a temperature in a range of 500° C. to 900° C., and obtains a solution in which the hard magnetic nano-particles are dispersed.

18. The method as claimed in claim 17, wherein the hard magnetic nano-particles are made of an alloy having, as a main component, an element selected from a group consisting of FePt, FePd and CoPt.

* * * * *